Sept. 20, 1960
E. P. GALBA
2,953,177
ALMOND HALVING APPARATUS
Filed May 25, 1959
3 Sheets-Sheet 1
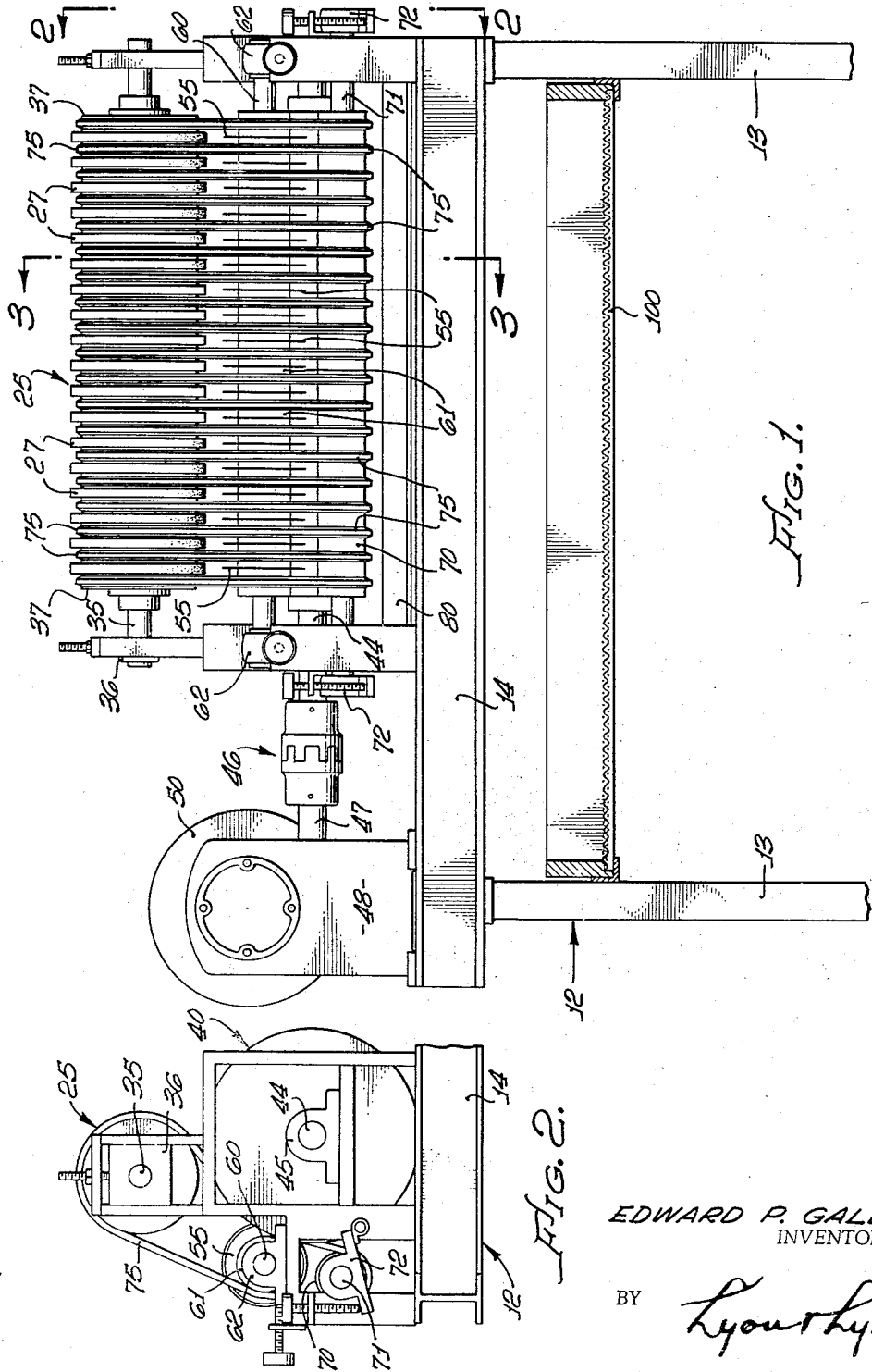
EDWARD P. GALBA
INVENTOR.
BY
*Lyon+Lyon*
ATTORNEYS.

Sept. 20, 1960     E. P. GALBA     2,953,177
ALMOND HALVING APPARATUS

Filed May 25, 1959     3 Sheets-Sheet 2

EDWARD P. GALBA
INVENTOR.

BY *Lyon & Lyon*
ATTORNEYS

EDWARD P. GALBA
INVENTOR.

ATTORNEYS.

United States Patent Office 2,953,177
Patented Sept. 20, 1960

2,953,177

ALMOND HALVING APPARATUS

Edward P. Galba, Paso Robles, Calif., assignor to California Almond Orchards, Inc., Paso Robles, Calif., a corporation of California Filed May 25, 1959, Ser. No. 815,397

9 Claims. (Cl. 146—73)

This invention relates to the treatment of almonds and has particular reference to an apparatus for halving almonds.

During the past decade the almond growing industry has made many advances in almond culture, resulting in the production of a greater proportion of large size almonds (less than 30 to the ounce). In some respects this has proven to be disadvantageous since many confection manufacturers, particularly those producing small candy bars, require small nut kernels due to limitations in size of the confection. These manufacturers require almonds that are small enough to be completely enclosed in the confection, but they prefer whole nut kernels to the chopped, sliced or broken kernels. The whole kernels promote better keeping quality of the confections due to the lack of any appreciable release of nut oils into the confection, as compared to the kernel fragments which present large cut or broken surfaces from which the oils are readily released.

Many attempts have been made to cut almonds in half longitudinally on a plane at right angles to the natural plane of cleavage of the kernel in order to provide almond particles of the desirable size but presenting a minimum area of cut surface. Prior to the invention disclosed in the copending application of Galba et al., Serial No. 706,753, filed January 2, 1958, these attempts were not entirely successful in that the cutting operations resulted in a large percentage of waste in slivers, quarters, thirds and other pieces of unacceptable size and excessive cut surface area which could not be used by the confection industry. The apparatus of said co-pending application solved the problems mentioned above, but the specific cutting means and means for gripping the almonds during the cutting operation disclosed therein were somewhat disadvantageous from the standpoint of wear of the machine parts and speed of operation. One of the principal objects of the present invention is therefore to provide an almond halving machine which is an improvement over that disclosed in said co-pending application.

Another object of the present invention is to provide a novel apparatus for halving almonds at a high rate of speed and with a minimum of wear of the machine parts.

Another object of the present invention is to provide an almond halving machine having improved structure for cutting the almonds and for gripping the almonds during the cutting operation.

Other objects and advantages of the present invention it is believed will be readily apparent from the following detailed description of a preferred embodiment thereof when read in connection with the accompanying drawings.

In the drawings:

Figure 1 is an end view of the apparatus of the present invention.

Figure 2 is a sectional view taken substantially on the line 2—2 of Figure 1.

Figure 3:
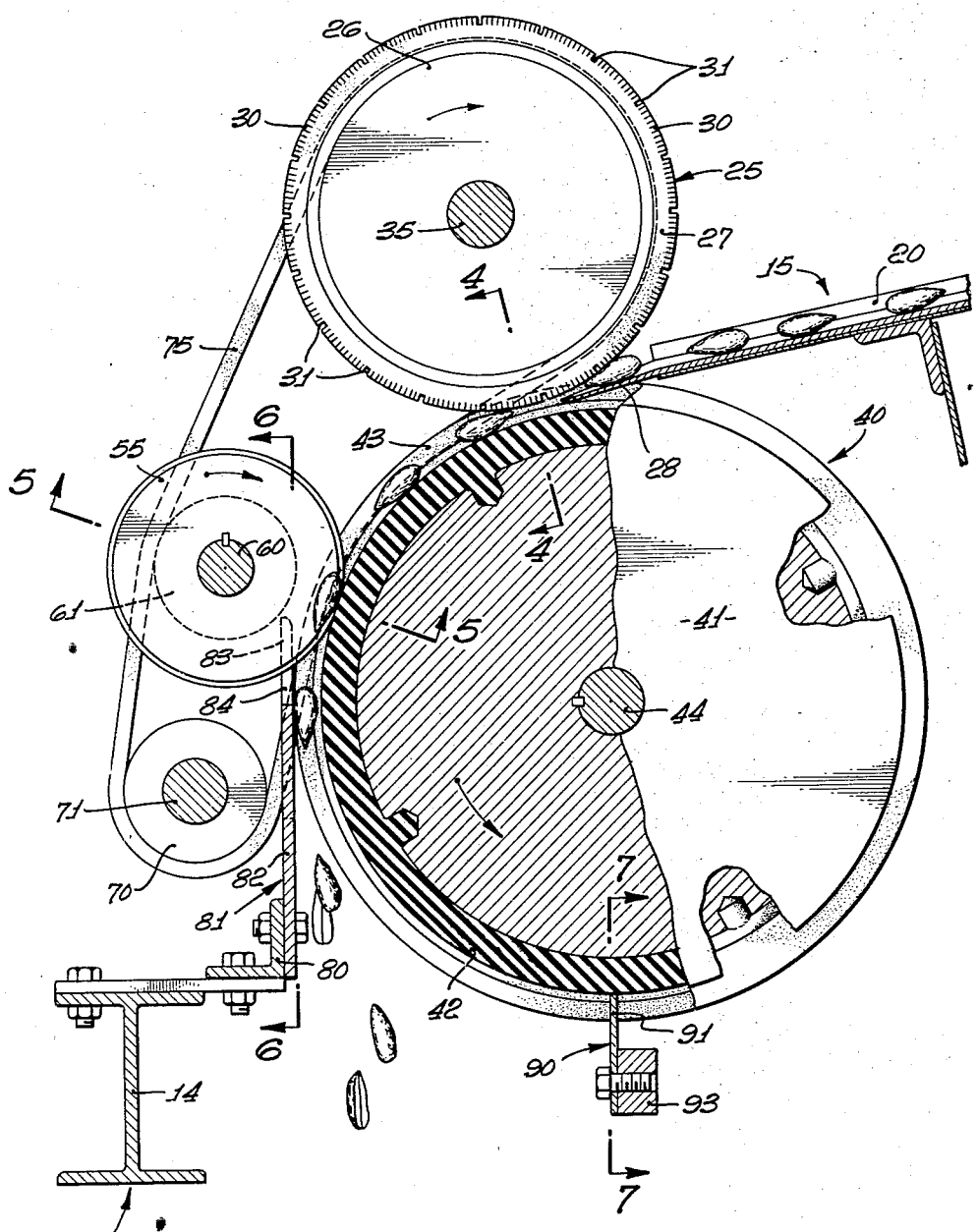
Figure 3 is a sectional view, on an enlarged scale, taken substantially on the line 3—3 of Figure 1.
Figure 4:
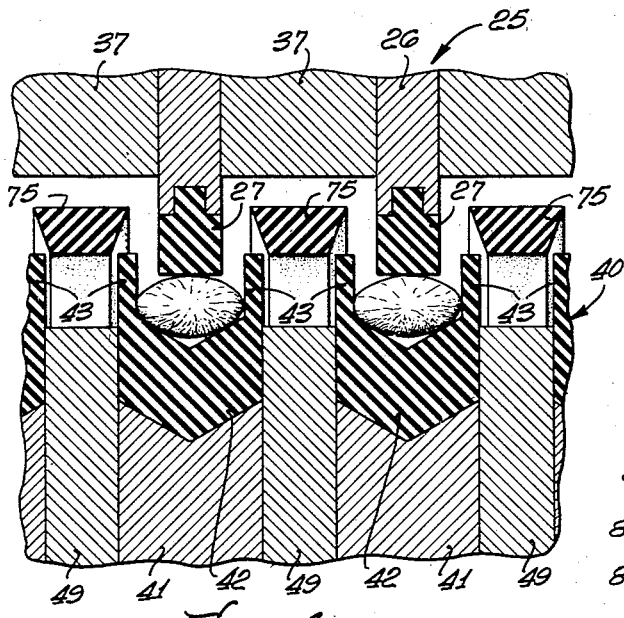
Figure 4 is a sectional view taken substantially on the line 4—4 of Figure 3.
Figure 6:
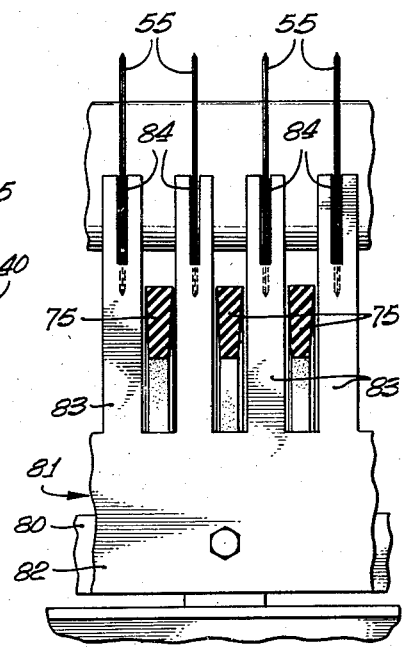
Figure 6 is a sectional view taken substantially on the line 6—6 of Figure 3.

Referring now to the drawings, the apparatus of the present invention includes a framework generally indicated 12 and comprising a plurality of legs 13 and horizontal beam members 14. An almond orienter assembly 15 of the type disclosed in said co-pending application is mounted on the framework. Almonds are fed to the orienter assembly in any convenient manner, but preferably as disclosed in said co-pending application. The orienter assembly includes a plurality of spaced U-shaped troughs 20 in which the almonds are aligned in single-depth rows as indicated in the drawings and as further described in said co-pending application.

Means are provided for feeding the almonds from the orienter troughs onto a nut gripping and conveying means. As shown in the drawings, the feeding means includes a plurality of feed rolls 25, one mounted in line with and forwardly of the discharge end of each of the troughs 20. Each feed roll, comprising a wheel portion 26 provided with a rubber or rubber-like ring or tire 27 having a generally cylindrical periphery, cooperates with a discharge ramp 28, one secured to and leading from each of the troughs 20. The peripheral surfaces of the tires 27 are provided with a plurality of spaced slits 30 interspersed with a plurality of spaced slots 31. The feed rolls 25 are each keyed to a common cross-shaft 35 mounted for rotation in suitable adjustable bearing assemblies 36 on the framework. Pulley members 37 are keyed to the shaft 35 and space the rolls 25 thereon.

The gripping and conveying means 40 includes a plurality of wheels 41, one mounted directly under each of the feed rolls 25. The wheels are provided with V-shaped peripheries, each forming a seat for a rubber or rubber-like ring 42 having a V-shaped central portion and a pair of radial side flanges 43. The wheels are keyed to the main drive shaft 44 journalled in bearings 45 carried on the framework, pulley members 49 also being keyed to the shaft 44 and spacing apart the wheels 41. The shaft 44 is connected by a coupling 46 to the shaft 47 of a gear box 48 driven by a motor 50.

It will be noted from an inspection of Figure 3 that the ramps 28 extend into the leading portion of the bite between the feed rolls 25 and wheels 41 each ramp also extending downwardly between the flanges 43 of each of the wheels 41.

Means are provided for cutting the almonds into halves and as shown in the drawings these means may include the rotary circular knife blades 55, one for each of the wheels 41, each of the blades extending between the appropriate pair of flanges 43 just short of the apex of the V-shaped periphery of the wheel. The knife blades 55 are keyed to a shaft 60 and spaced thereon by means of pulley members 61 also keyed to the shaft. The shaft is journalled in adjustable bearings 62 secured to the framework.

Figure 5:
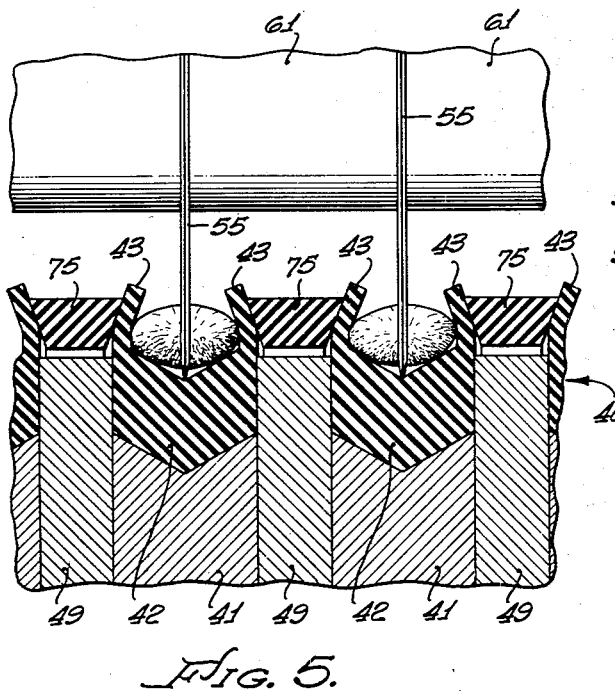
Figure 5 is a sectional view taken substantially on the line 5—5 of Figure 3.
Figure 7:
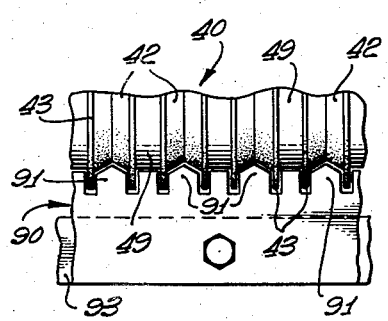
Figure 7 is a sectional view taken substantially on the line 7—7 of Figure 3.

Means are provided for inwardly deforming the portions of the flanges 43 above and adjacent to the knife blades 55 so that the flanges grip the almonds therebetween during the cutting operation. As shown in the drawings these means include an idler pulley 70 keyed to a shaft 71 journalled in bearings 72 pivotally and adjustably mounted on the framework. A plurality of V-belt members 75 are provided, one extending from each of the pulley members 37 to the pulley 70. The forward run of each of the belt members 75 extends about a portion of the periphery of each of the pulley members 49 in driven relationship therewith, the opposite run of each belt member contacting a portion of each of the pulley members 61 in driving relationship therewith. The maximum width of the belt members is greater than the spacing between the wheels 42 so that the flanges 43 of each wheel are contacted by the sides of the belt members and deformed toward each other in the areas of contact between the belt members and the pulley members as is shown best in Figure 5, firmly gripping the almonds therebetween.

Below the knife blades 55 the belt members 75 leave contact with the flanges, permitting the flanges to return to their normal parallel disposition so that the cut almonds are freed to fall by gravity out of the grooves formed by the flanges. Means are provided to prevent pick-up by the knife blades of the cut almond halves and as shown in the drawings these means may include the brackets 80 which carry a stripper member 81. The member 81 comprises a base plate 82 and a plurality of spaced fingers 83 extending upwardly therefrom, each finger being provided with a slot 84 for the passage of a knife blade therethrough.

Means are provided for removing any cut almonds which might adhere to the rings 42, and as shown in the drawings, these means may include a comb-like member 90 having a plurality of fingers 91, one extending into each of the spaces between each pair of flanges 43. The member 90 is secured to a cross bar 93 which in turn is secured to the apparatus framework.

The rubber rolls 25 and rings 42 are preferably lubricated by means of water from suitably disposed water spray nozzles (not shown).

In operation of the apparatus the almonds to be halved are pre-soaked in water for from 2 to 5 minutes, removed from the water, held in a confined space for several hours to prevent drying and to promote absorption and even distribution of water so that the kernels are in a pliable condition. The kernels are then delivered to the orienter assembly 15 and are oriented longitudinally thereon in rows.

The almonds proceed from the discharge ends of the troughs onto the discharge ramps 28. While the almonds are on the ramps they are contacted by the peripheral edges of the feed rolls 25, the speed of travel of the almonds being thereby accelerated so that the velocity thereof is substantially the same as the peripheral velocity of the wheels 41. It will be noted that only the wheels 41 are directly driven by the motor 50, the rolls 25 and the knife blades 55 being driven from the wheels 41 by means of the belt members 75.

The rings 27 compress the almonds into the grooves formed by the flanges 43 and the almonds are carried thereby to the knife blades, the gripping action of the flanges being accomplished by the belt members 75 prior to arrival of the almonds at the area of the knife blades. The almonds are then brought into contact with the knife blades whereby they are halved, the two halves being free to fall out of the grooves after relaxation of the flanges. The halves fall onto a foraminous collection tray 100.

Having fully described my invention, it is to be understood that I do not wish to be limited to the details set forth, but my invention is of the full scope of the appended claims.

I claim:

1. In apparatus for halving almonds, the combination of a framework, means on said framework for gripping and conveying individual almonds, said gripping and conveying means including a pair of spaced, deformable flanges, means for feeding almonds to said gripping and conveying means, cutting means on said framework in a position to halve almonds on said gripping and conveying means, and means for deforming said flanges in directions to grip the almonds during the cutting operation, said last-named means including a pair of moving belt members adapted to contact said flanges to deform the same.

2. In apparatus for halving almonds, the combination of a framework, means on said framework for gripping and conveying individual almonds, said gripping and conveying means including a wheel carrying a peripheral rubber-like ring having a pair of spaced, deformable flanges, means for feeding almonds to said gripping and conveying means, cutting means on said framework in a position to halve almonds on said gripping and conveying means, and means for deforming said flanges in directions to grip the almonds during the cutting operation, said last-named means including a pair of moving belt members adapted to contact said flanges to deform the same.

3. In apparatus for halving almonds, the combination of a framework, means on said framework for gripping and conveying individual almonds, said gripping and conveying means including a pair of spaced, deformable flanges, means for feeding almonds to said gripping and conveying means, cutting means on said framework in a position to halve almonds on said gripping and conveying means, means for deforming said flanges in directions to grip the almonds during the cutting operation, said last-named means including a pair of moving belt members adapted to contact said flanges to deform the same, and means for moving said belt members at the same rate of speed as said gripping and conveying means.

4. In apparatus for halving almonds, the combination of a framework, means on said framework for gripping and conveying individual almonds, said gripping and conveying means including a wheel carrying a peripheral rubber-like ring having a pair of spaced, deformable flanges, means for feeding almonds to said gripping and conveying means, cutting means on said framework in a position to halve almonds on said gripping and conveying means, means for deforming said flanges in directions to grip the almonds during the cutting operation, said last-named means including a pair of moving belt members adapted to contact said flanges to deform the same, and means for moving said belt members at the same rate of speed as said gripping and conveying means.

5. In apparatus for halving almonds, the combination of a framework, means on said framework for gripping and conveying individual almonds, said gripping and conveying means including a pair of spaced, deformable flanges, means for feeding almonds to said gripping and conveying means, cutting means on said framework in a position to halve almonds on said gripping and conveying means, said cutting means comprising a rotary knife blade, and means for deforming said flanges in directions to grip the almonds during the cutting operation, said last-named means including a pair of moving belt members adapted to contact said flanges to deform the same, said moving belt members driving said knife blade.

6. In apparatus for halving almonds, the combination of a framework, means on said framework for gripping and conveying individual almonds, said gripping and conveying means including a wheel carrying a peripheral rubber-like ring having a pair of spaced, deformable flanges, means for feeding almonds to said gripping and conveying means, cutting means on said framework in a position to halve almonds on said gripping and conveying means, said cutting means comprising a rotary knife blade, means for deforming said flanges in directions to grip the almonds during the cutting operation, said last-named means including a pair of moving belt members adapted to contact said flanges to deform the same, said moving belt members driving said knife blade, and means for moving said belt members at the same rate of speed as said gripping and conveying means.

7. In apparatus for halving almonds, the combination of a framework, means for orienting almonds in a longitudinal row, means on said framework for gripping and conveying individual almonds, said gripping and conveying means including a pair of spaced, deformable flanges, means for feeding almonds to said gripping and conveying means, said feeding means including a discharge ramp extending downwardly from said orienting means and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, cutting means on said framework in a position to halve almonds on said gripping and conveying means, and means for deforming said flanges in directions to grip the almonds during the cutting operation, said last-named means including a pair of moving belt members adapted to contact said flanges to deform the same.

8. In apparatus for having almonds, the combination of a framework, means for orienting almonds in a longitudinal row, means on said framework for gripping and conveying individual almonds, said gripping and conveying means including a pair of spaced, deformable flanges, means for feeding almonds to said gripping and conveying means, said feeding means including a discharge ramp extending downwardly from said orienting means and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, cutting means on said framework in a position to halve almonds on said gripping and conveying means, said cutting means comprising a rotary knife blade, and means for deforming said flanges in directions to grip the almonds during the cutting operation, said last-named means including a pair of moving belt members adapted to contact said flanges to deform the same, said moving belt members driving said knife blade.

9. In apparatus for halving almonds, the combination of a framework, means for orienting almonds in a longitudinal row, means on said framework for gripping and conveying individual almonds, said gripping and conveying means including a wheel carrying a peripheral rubber-like ring having a pair of spaced, deformable flanges, means for feeding almonds to said gripping and conveying means, said feeding means including a discharge ramp extending downwardly from said orienting means and a feed roll having a rubber-like peripheral surface moving at a velocity substantially the same as the velocity of the gripping and conveying means, said feed roll being spaced above the discharge ramp in a position to contact almonds thereon, to move said almonds across said ramp and to compress said almonds into the space between said flanges, cutting means on said framework in a position to halve almonds on said gripping and conveying means, said cutting means comprising a rotary knife blade, and means for deforming said flanges in directions to grip the almonds during the cutting operation, said last-named means including a pair of moving belt members adapted to contact said flanges to deform the same, said belt members driving said knife blade and said feed roll.

References Cited in the file of this patent

UNITED STATES PATENTS 2,745,453   Perrelli et al. _____ May 15, 1956